(12) United States Patent
Tamata et al.

(10) Patent No.: US 7,128,882 B2
(45) Date of Patent: Oct. 31, 2006

(54) METHOD AND APPARATUS FOR TREATING PERFLUOROCOMPOUNDS

(75) Inventors: Shin Tamata, Oarai (JP); Ri Koukun, Hitachi (JP); Kazuyoshi Irie, Hitachi (JP); Yoshiki Shibano, Hitachi (JP); Shuichi Kanno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 10/090,817

(22) Filed: Mar. 6, 2002

(65) Prior Publication Data

US 2002/0131913 A1 Sep. 19, 2002

Related U.S. Application Data

(62) Division of application No. 09/940,984, filed on Aug. 29, 2001, now abandoned.

(30) Foreign Application Priority Data

Mar. 16, 2001 (JP) .............................. 2001-075241

(51) Int. Cl.
*B01D 50/00* (2006.01)
*B01D 47/00* (2006.01)
*B01D 53/14* (2006.01)

(52) U.S. Cl. ............ 422/177; 422/190; 422/211; 96/280; 96/284

(58) Field of Classification Search .......... 422/194, 422/177, 190, 211; 95/149, 55; 423/483; 588/206; 96/280, 284
See application file for complete search history.

(56) References Cited

U.S. PATENT DOCUMENTS

| 4,057,404 | A | 11/1977 | Diemer, Jr. et al. |
| 4,980,090 | A | 12/1990 | Manchak, Jr. |
| 5,605,400 | A | 2/1997 | Kojima |
| 6,069,291 | A * | 5/2000 | Rossin et al. ............... 588/316 |
| 6,126,906 | A * | 10/2000 | Imamura ..................... 422/170 |
| 6,426,443 | B1 * | 7/2002 | Rossin et al. ............... 588/317 |
| 6,444,011 | B1 * | 9/2002 | Li et al. ........................ 95/45 |
| 6,563,011 | B1 | 5/2003 | Atobe et al. |
| 6,605,133 | B1 * | 8/2003 | Li et al. ........................ 95/45 |
| 2001/0001652 | A1 | 5/2001 | Kanno et al. |
| 2003/0049190 | A1 | 3/2003 | Irie et al. |
| 2003/0103883 | A1 | 6/2003 | Mori |
| 2003/0223929 | A1 * | 12/2003 | Kokun et al. ............ 423/240 S |
| 2004/0241069 | A1 * | 12/2004 | Kokun et al. ............ 423/240 S |

FOREIGN PATENT DOCUMENTS

| EP | 0754487 | * | 1/1997 |
| EP | 0885648 | | 12/1998 |

(Continued)

*Primary Examiner*—N. Bhat
(74) *Attorney, Agent, or Firm*—Mattingly, Stanger, Malur & Brundidge, P.C.

(57) ABSTRACT

In a PFC decomposing apparatus according to the present invention, PFC contained in a discharged gas is decomposed in catalyst cartridge 3 packed with a catalyst containing 80% $Al_2O_3$ and 20% NiO. The discharged gas containing acid gases as a decomposition gas is cooled in cooling chamber 6 and led to discharged gas washing column 13, where the acid gases are removed. Mists of acid gases ($SO_3$ mists or NOx mists) entrained in the discharged gas are separed in cyclone 16. Compressed air at about 0.1 Mpa is fed to ejector 24 through air feed pipe 56. The interior of ejector 24 is brought into a negative pressure state by the compressed air to such the discharged gas from cyclone 16 and ejector. Ejector 24 can reduce a frequency of maintenance inspection, as compared with a blower.

6 Claims, 10 Drawing Sheets

FOREIGN PATENT DOCUMENTS

| | | | |
|---|---|---|---|
| EP | 0916388 | | 5/1999 |
| EP | 1027918 | * | 8/2000 |
| EP | 1101524 | * | 5/2001 |
| JP | 10286434 | * | 10/1998 |
| JP | 11-70322 | | 3/1999 |
| JP | 11-319485 | | 11/1999 |

* cited by examiner

US 7,128,882 B2

METHOD AND APPARATUS FOR TREATING PERFLUOROCOMPOUNDS

This application is a Divisional of Ser. No. 09/940,984, filed Aug. 29, 2001 now abandoned.

BACKGROUND OF THE INVENTION

The present invention relates to a method and an apparatus for treating perfluorocompunds, particularly to a method and an apparatus for treating perfluorocompounds, suitable for decomposition of perfluorocompounds discharged from a semiconductor production paint.

"Perfluorocompounds" is a general term for compounds of carbon and fluorine; carbon, hydrogen and fluorine; sulfur and fluorine; and nitrogen and fluorine, such as $CF_4$, $CHF_3$, $C_2F_6$, $CH_2F_2$, $C_3F_8$, $C_5F_8$, $SF_6$, $NF_3$, etc. which are all free from chlorine. Perfluorocompounds (which will be hereinafter referred to as "PFC") are in a gaseous state and are used as an etching gas and a cleaning gas in the semiconductor production method. PFC has a long life (e.g. 10,000 years in the case of $C_2F_6$ and 3,200 years in the case of $SF_6$) and is considered one of global warming gases with a high warming coefficient, which are subject to atmospheric emission control. Thus, various PFC-decomposing methods have been so far studied. One of the methods is disclosed in JP-A-11-70322 and JP-A-11-319485, where PFC is hydrolized in the presence of a catalyst, and the discharged gas containing the decomposition gases resulting from the PFC decomposition is washed with water (or an aqueous alkaline solution) and then discharged by a blower.

A higher reliability is required for apparatuses relating to the semiconductor production in a semiconductor production plant from the viewpoint of continuous operation of apparatuses for producing semiconductors. A higher reliability is also required for an apparatus for treating PFC contained in the discharged gas from etching apparatuses, because, if it is out of order, operation of several etching apparatuses connected thereto must be shut down.

SUMMARY OF THE INVENTION

An object of the present invention is to provide a method and an apparatus for treating perfluorocompounds, capable of reducing the frequency of apparatus maintenance inspection.

According to the present invention, the object of the present invention can be attained by sucking a discharged gas containing acid gases generated by decomposition of perfluorocompounds by a jet stream of an injected gas, thereby ejecting the discharged gas. Since the discharged gas is sucked and ejected by a jet stream gas of an injected gas, the gas suction apparatus for use in the present invention has no driving parts, and thus the frequency of apparatus maintenance inspection can be considerably reduced, resulting in remarkable reduction in the frequency of maintenance inspection of an apparatus for treating perfluorocompounds and an increase in the continuous operating rate of the apparatus for treating perfluorocompounds. Particularly, in the case of a perfluorocompounds-containing discharged gas from a semiconductor producing apparatus, the reduction in the frequency of maintenance inspection of the apparatus for treating perfluorocompounds means an increase in the continuous operating rate of the semiconductor producing apparatus, resulting in a considerable increase in the semiconductor production efficiency. It is desirable to use an ejector as a gas suction apparatus.

Since the discharged gas containing acid gases generated by decomposition of perfluorocompounds is preferably brought into contact with one of water and an aqueous alkaline solution, the acid gases can be simply removed from the discharged gas. Furthermore, since mists generated by contact with one of water and an aqueous alkaline solution can be separated from the discharged gas, corrosion of downstream machinery and apparatuses, and pipings (or ducts) in contact with the discharged gas can be remarkably reduced.

It is preferable to provide a tank for receiving one of the water and the aqueous alkaline solution discharged from the acid gas removing apparatus below the acid gas removing apparatus and a mist separator. The water or the aqueous alkaline solution discharged from the acid gas removing apparatus can be collected into the tank simply by gravity. Furthermore, the mists separated in the mist separator can be discharged into the tank simply by gravity through a discharge piping. No power is required for collecting the water or the aqueous alkaline solution and the separated mists, so the structure of the apparatus for treating perfluorocompounds can be simplified.

Decomposition of perfluorocompounds is catalytically carried out, where preferably a catalyst contains an Al oxide and further contains at least one of oxides of metals selected from Zn, Ni, Ti, F, Sn, Co, Zr, Ce, Si and Pt. By use of such a catalyst, the perfluorocompounds can be efficiently decomposed at low temperatures of 200°–800° C. It is particularly preferable to use the catalyst in the form of Al-containing composite oxide such as $NiAl_2O_4$ and $ZnAl_2O_4$.

Figure 1:
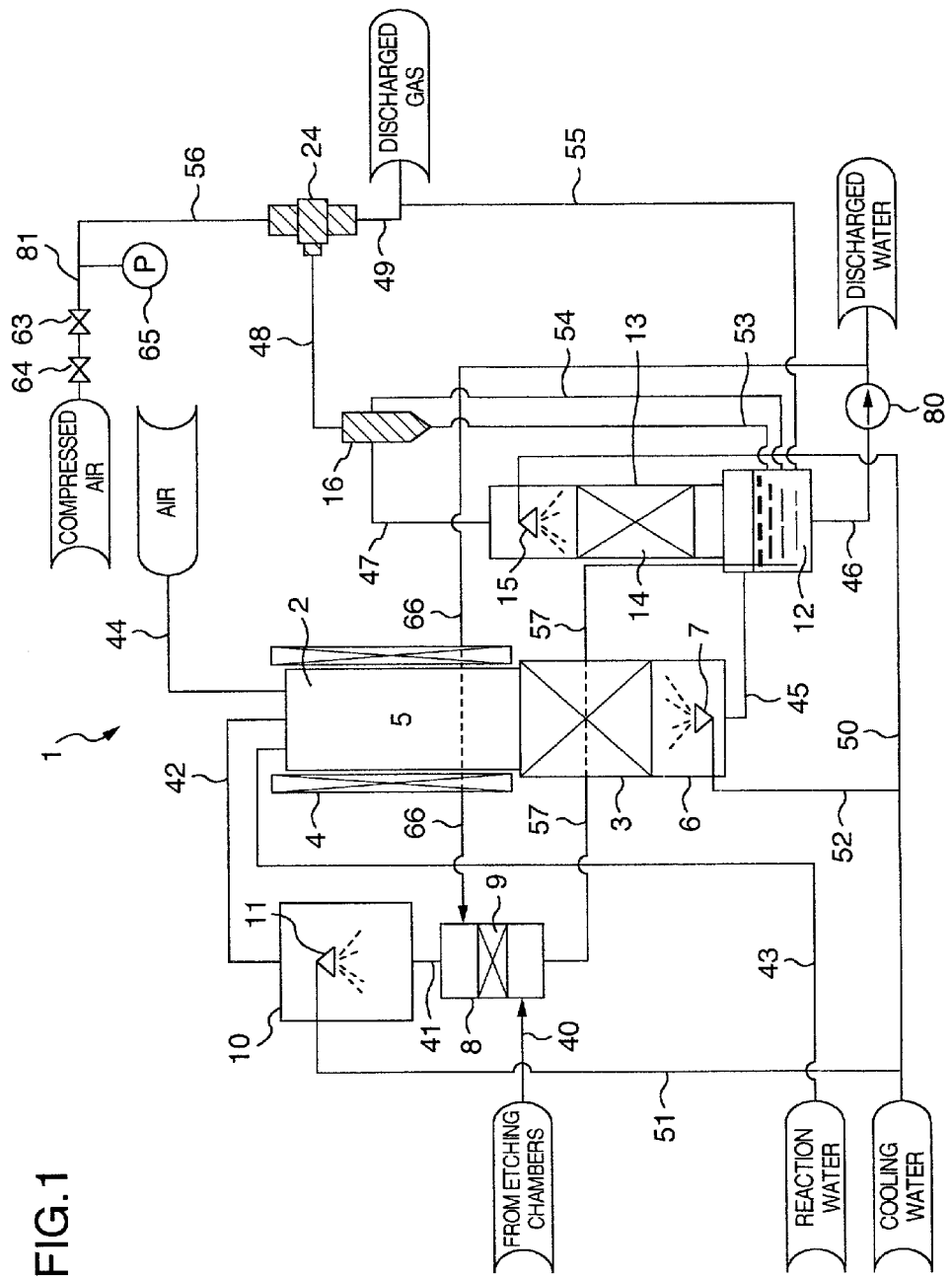
FIG. 1 is a structural diagram of an apparatus for treating perfluorocompounds according to one preferable embodiment of the present invention.

In the foregoing drawings, reference numerals have the following designations:

1: apparatus for treating perfluorocompounds; 2: reactor; 3: catalyst cartridge; 4: heater; 6: cooling chamber; 7, 11 and 15: sprays; 8: inlet packed column; 10: spray column; 12: discharged water tank; 13: discharged gas washing column; 16: cyclone; 19: lower compartment; 20: upper compartment; 24: ejector; 25: ejector body; 27: injection nozzle; 28: nozzle member; 29: injection member; 30: injection orifice; 34: ejection nozzle, 35: ejection passage; 46: discharged water piping; 50, 51 and 52: water feed pipes; 56: air feed pipe; 62: liquid level; 63: pressure control value; 67 and 70: etching apparatuses; 73A, 73B, 73C and 73D: vacuum pumps; 81: compressed air feeder; 82: pretreating apparatus.

DETAILED DESCRIPTION OF THE INVENTION

In the course of development of a series of apparatuses for decomposing PFC and treating, and ejecting the discharged gas from the decomposition treatment, the present inventors have found that blowers for transferring the discharged gas from the treatment are highly corroded by acid gases remaining in the discharged gas (the acids gases are generated by decomposition of PFC), which plays an important role in the improvement of continuous operating rate of the apparatus for treating perfluorocompounds (which may be hereinafter referred to as "PFC treating apparatus"). A result of studies made on the corrosion of blowers by the present inventors will be described below:

In the catalytic decomposition of PFC disclosed in JP-A-11-70322, decomposition gases generate. That is, decomposition of $CF_4$ results in generation of $CO_2$ and HF, decomposition of $SF_6$ results in generation of $SO_3$ and HF, and decomposition of $NF_3$ results in generation of $NO_x$. (NO and $NO_2$) and HF. In this manner, decomposition of PFC results in formation of various acid gases (HF, $SO_3$ and $NO_x$). The foregoing decomposition reactions can be given by the following reaction equations:

$$CF_4 + 2H_2O \rightarrow CO_2 + 4HF \quad (1)$$

$$SF_6 + 3H_2O \rightarrow SO_3 + 6HF \quad (2)$$

$$2NF_3 + 3H_2O \rightarrow NO + NO_2 + 6HF \quad (3)$$

Acid gases ($SO_3$, HF, NO and $NO_2$) as decomposition gases of PFC can be absorbed into water (or an aqueous alkaline solution) in a discharged gas washing column and removed from the discharged gas thereby. However, as a result of tests, the present inventors have found that besides a small amount of acid gases, acid gas mists are discharged from the discharged gas washing column together with the discharged gas. For example, when a discharged gas containing 0.5% $SF_6$ was fed into a catalyst cartridge packed with a catalyst at a flow rate of 60 l/min to decompose $SF_6$, about 150 cc/hr of water ($SO_3$ mists) was discharged from the discharged gas washing column to which the discharged gas (containing $SO_3$) from the catalyst cartridge was fed. That is, acid gas components are carried over as mists, while taking up moistures. Once the moisture-containing $SO_3$ mists enter the blower, condensation of the $SO_3$ mists takes place in the impeller chamber of the blower, thereby further dissolving $SO_3$ into water to make a sulfuric acid solution. The sulfuric acid solution acts to corrode the blower. In the case that $NF_3$ is used as PFC, a nitric acid solution is formed in the blower, corroding the blower. In the case that the blower is treated with an anticorrosive coating treatment, the anticorrosive coating treatment cannot be extended even to the bearing, etc. of the blower, and thus the blower cannot be operated continuously for a long time. Furthermore, the frequency of maintenance inspection of the blower upon discontinuation of continuous operation will be inevitably increased and the continuous operating rate of PFC treating apparatus will be lowered.

To prevent carry-over of corrosive acid gas mists through the course from the discharged gas washing column to the blower, it has been proposed to provide a mist separator, but 100% removal of acid gas mists (sulfuric acid mists and nitric acid mists) have been difficult to attain even by the mist separator. The acid gas mists not removed by the mist separator still acts to corrode the blower, as mentioned above.

The present inventors have found, for the first time, that not only leading to the blower of the acid gas mists not removed in the discharged gas washing column and discharged therefrom, but also the acid gas mists corrodes the blower. It is difficult to completely remove the acid gas mists in the mist separator. Blower corrosion has an adverse effect on the semiconductor production, while increasing, the frequency of maintenance inspection such as inspection, cleaning, part replacement, etc. upon shutting down the blower. The present inventors have reached a conclusion that a gas ejecting apparatus with no driving part must be used in place of the blower, and have decided to use a gas ejecting apparatus capable of sucking the discharged gas by a jet stream of an injected gas (e.g. ejector).

A specific example of PFC treating apparatus with such a gas ejecting apparatus capable of sucking the discharged gas by a jet stream of an injected gas will be described below.

Figure 2:
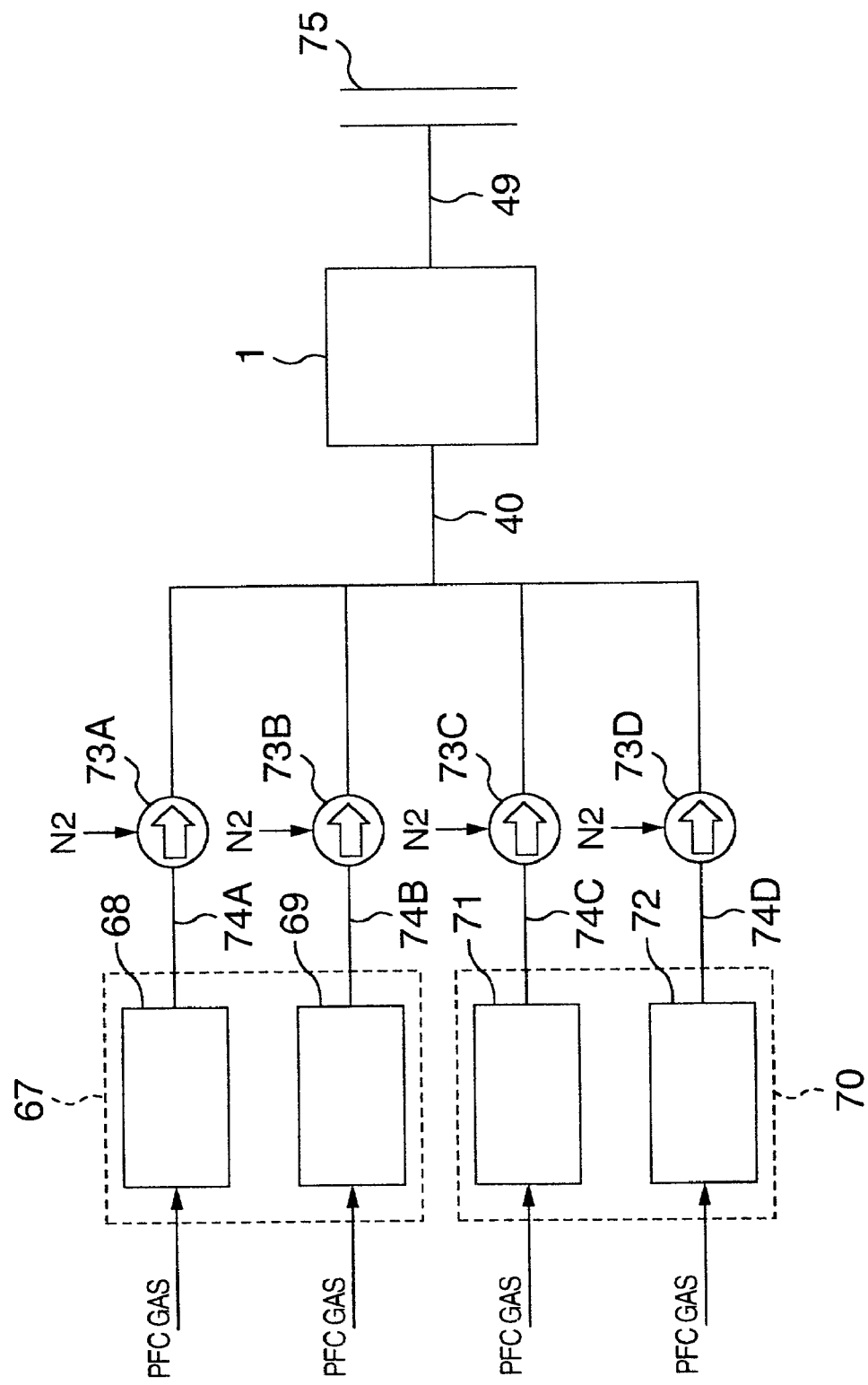
FIG. 2 is a structural diagram of a semiconductor production plant in which the present apparatus for treating perfluorocompounds is incorporated.

At first, a semiconductor production plant in which the present PFC treating apparatus is incorporated will be outlined, referring to FIG. 2. The semiconductor production plant comprises a semiconductor production apparatus and a discharged gas treating apparatus for treating a discharged gas from the semiconductor production apparatus. The semiconductor production apparatus is provided with, for example, etching apparatus 67 with etching chambers 68 and 69 and etching apparatus 70 with etching chambers 71 and 72. As the discharged gas treating apparatus, PFC treating apparatus 1 for treating PFC-containing discharged gas from etching chambers 68, 69, 71 and 72 is used. Gas discharge pipes 74A, 74B, 74C and 74D connected to etching chambers 68, 69, 71 and 72, respectively, are put into one piping 40. PFC treating apparatus 1 is connected to piping 40 on one hand, and to discharged gas duct 75 through piping 49 on the other hand. Vacuum pumps 73A, 73B, 73C and 73D are provided in gas discharge pipes 74A, 74B, 74C and 74D, respectively.

PFC gas as an etching gas is fed to etching chambers 68, 69, 71 and 72; each in a vacuum state, respectively. The PFC gas is brought into a plasma state to conduct etching treatments of wafers as semiconductor materials, respectively. A portion (10–30%) of the PFC gas fed each to etching chambers 68, 69, 71 and 72 is consumed by the etching treatments in the etching chambers. By driving vacuum pumps 73A, 73B, 73C and 73D, discharged gases from etching chambers 68, 69, 71 and 72 are passed through gas discharge pipes 74A, 74B, 74C and 74D, respectively, joined into piping 40 and fed to PFC treating apparatus 1. The discharged gas contains PFC gas not consumed in etching chambers 68, 69, 71 and 72. Still furthermore, the discharged gas contains HF secondarily generated from the PFC gas in the etching chambers, $SiF_4$, etc. generated by etching the wafers. To protect the bearings, etc. of vacuum pumps 73A, 73B, 73C and 73D for bringing etching chambers 68, 69, 71 and 72 into a negative pressure state from HF as a corrosive acid gas, a $N_2$ gas is fed to the bearings of the vacuum pumps. That is, the PFC concentration of the discharged gas led to PFC treating apparatus 1 is approximately 0.5%. The PFC gas is decomposed in PFC treating apparatus 1. The discharged gas from PFC treating apparatus 1 is discharged to discharged gas duct 75 through piping 49. The PFC concentration of discharged gas to PFC treating apparatus 1 and that of discharged gas from PFC treating apparatus 1 are measured. The PFC concentration of discharged gas from PFC treating apparatus 1 is monitored, and when the concentration exceeds a set concentration, an alarm is given. Still furthermore, soundness of catalytic reaction or timing of catalyst exchange due to catalyst degradation is checked from a decomposition ratio calculated from PFC concentrations between the inlet and the outlet of PFC treating apparatus 1.

DESCRIPTION OF PREFERRED EMBODIMENTS

Several embodiments of the present PFC treating apparatus applied to treatment of a discharged gas from the semiconductor production method will be described in detail below. Throughout the drawings showing the embodiments, same structural members are identified with the same reference numerals.

A PFC treating apparatus according to one preferable embodiment of the present invention will be described below, referring to FIG. 1.

PFC treating apparatus 1 of this embodiment comprises a silicon removing apparatus, reactor 2, coding chamber 6, discharged water tank 12, discharged gas washing column 13, cyclone 16 and ejector 24. The silicon removing apparatus comprises inlet packed column 8 and spray column 10. Inlet packed column 8 has packed bed 9 packed with packings such as Raschig rings within it. Spray column 10 has spray 11 within it. Piping 40 is connected to the space below packed bed 9 in inlet packed column 8. Space above packed bed 9 in inlet packed column 8 is connected to spray column through piping 41. Reactor 2 has catalyst cartridge 3 and heating space 5 within it. Catalyst cartridge 3 has a catalyst bed packed with a catalyst within it. Catalyst for use in the catalyst bed is an alumina-based catalyst containing 80% $Al_2O_3$ as an Al oxide and 20% NiO as a Ni oxide. Heating space 5 is provided upstream of catalyst cartridge 3. Heater 4 is provided on the outside of reactor 2 so as to surround heating space 5. Cooling chamber 6 connected to reactor 2 has spray 7 within it and is positioned below catalyst cartridge 3. Piping 42 connects spray column 10 to heating space 5. Piping 43 for feeding water (or steam) and piping 44 for feeding air are each connected to heating space 5.

Figure 7:
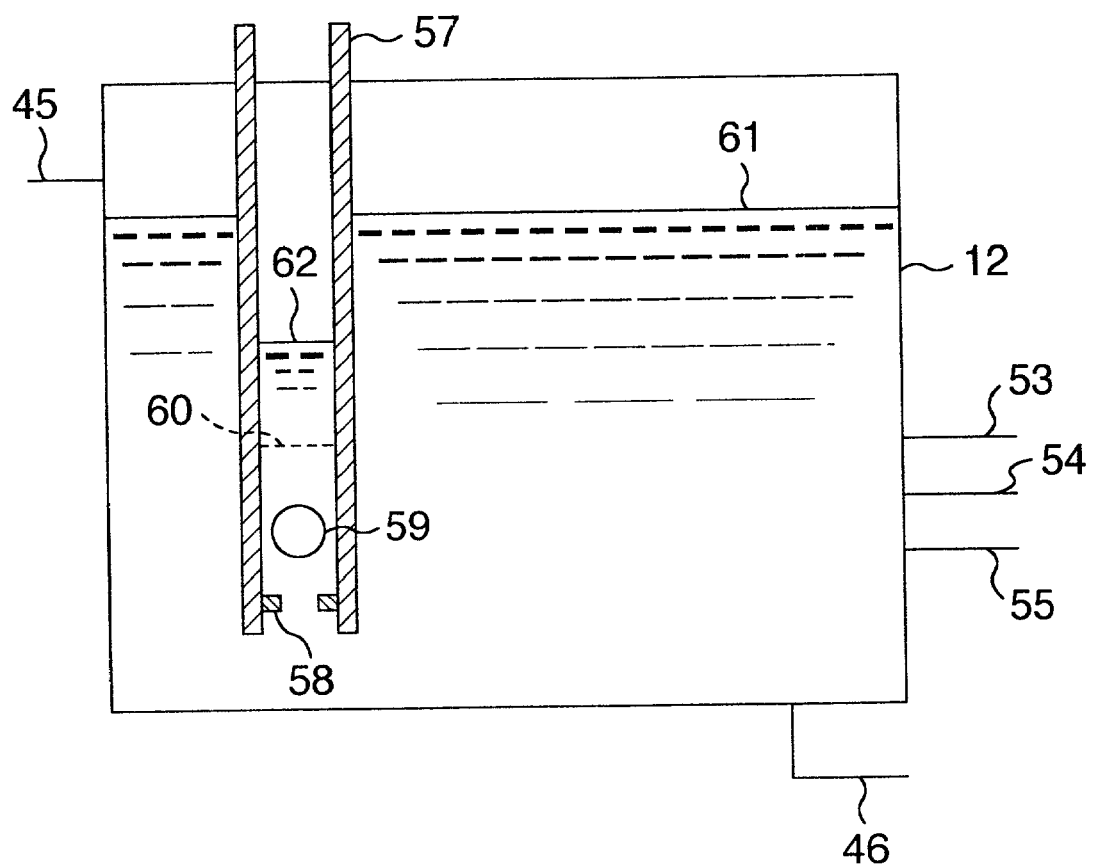
FIG. 7 is a vertical cross-sectional view of discharged water tank shown in FIG. 1.

Discharged gas washing column 13 as an acid gas removing apparatus has spray 15 at the upper position within it and packed bed 14 packed with plastic Raschig rings below spray 15. Discharged water tank 12 connected to discharged gas washing column 13 is provided below discharged gas washing column 13. Discharged water tank 12 is connected to cooling chamber 6 through piping 45. Piping 57 connected to space below packed bed 9 in inlet packed column 8 is inserted into discharged water tank 12 from the top side, as shown in FIG. 7. Piping 57 positioned in discharged water tank 12 has float seat 58 for establishing a water seal structure, float 59 and float stopper 60. Annular float seat 58 is provided at the lower end of the inside wall of piping 57. Float stopper 60 of coarse wire net is provided at a position above float seat 58 and within piping 57. In piping 57, float 59 is provided between float seat 58 and float stopper 60. Discharged water pipe 46 with discharged water pump 80 is connected to the bottom of discharged water tank 12. Piping 66 is connected to discharged water pipe 46 at a position downstream of discharged water pump 80 and is further connected to space above packed bed 9 in inlet packed column 8. Piping 57 connected to the bottom of inlet packed column 8, i.e. below packed bed 9 in inlet packed column 9, is inserted into discharged water tank 12.

Figure 3:
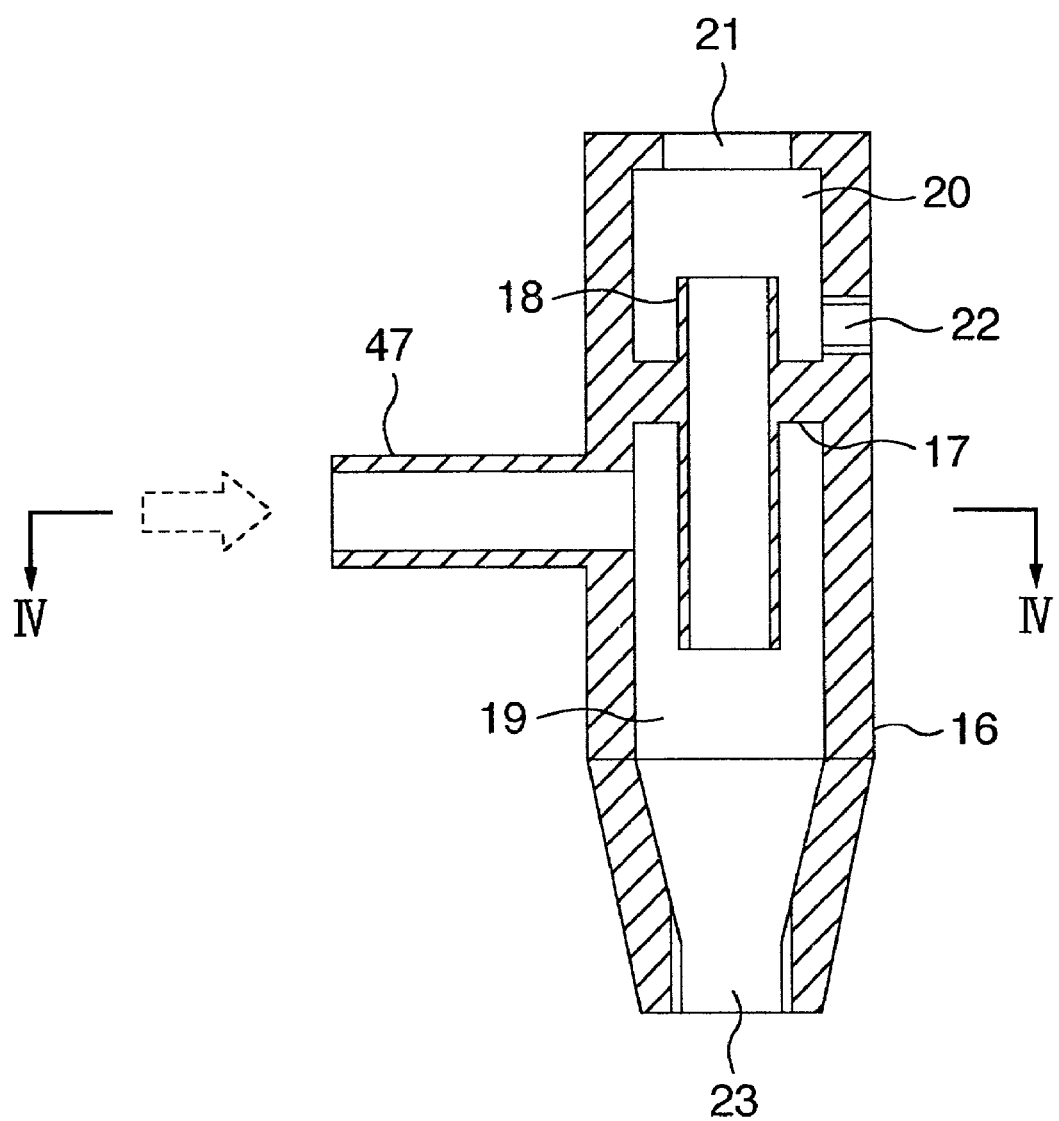
FIG. 3 is a vertical cross-sectional view of a cyclone shown in FIG. 1.
Figure 4:
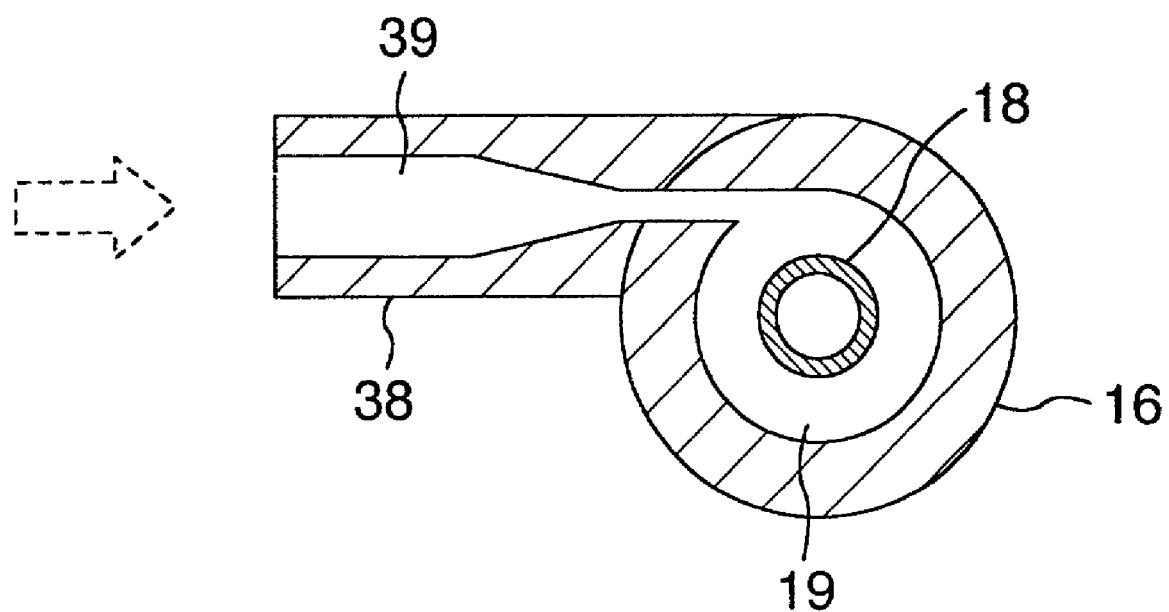
FIG. 4 is a cross-sectional view along the line IV—IV of FIG. 3.

Structure of cyclone 16 as a mist separator will be described below, referring to FIGS. 3 and 4.

Cyclone 16 has lower compartment 19 and upper compartment 20, both being partitioned by partition wall 17, within it. Discharged gas feed member 38 is extended in the tangential direction to the inside wall of lower compartment 19. Flow passage 39 in discharged gas feed member 38 is tapered toward lower compartment 19. Piping 47 connected to the top of discharged gas washing column 13 is connected to discharged gas feed member 38. Passage 18 penetrated through partition wall 17 connects lower compartment 19 to upper compartment 20. Drain outlet 23 formed at the bottom of lower compartment 19 is connected to drain piping 53, which is connected to discharge water tank 12. Drain outlet 22 formed in upper compartment 20 is connected to discharged water tank 12 through drain piping 54. A filter, an electrostatic precipitator and an activated carbon adsorption column can be used as a mist separator besides the cyclone.

Figure 5:
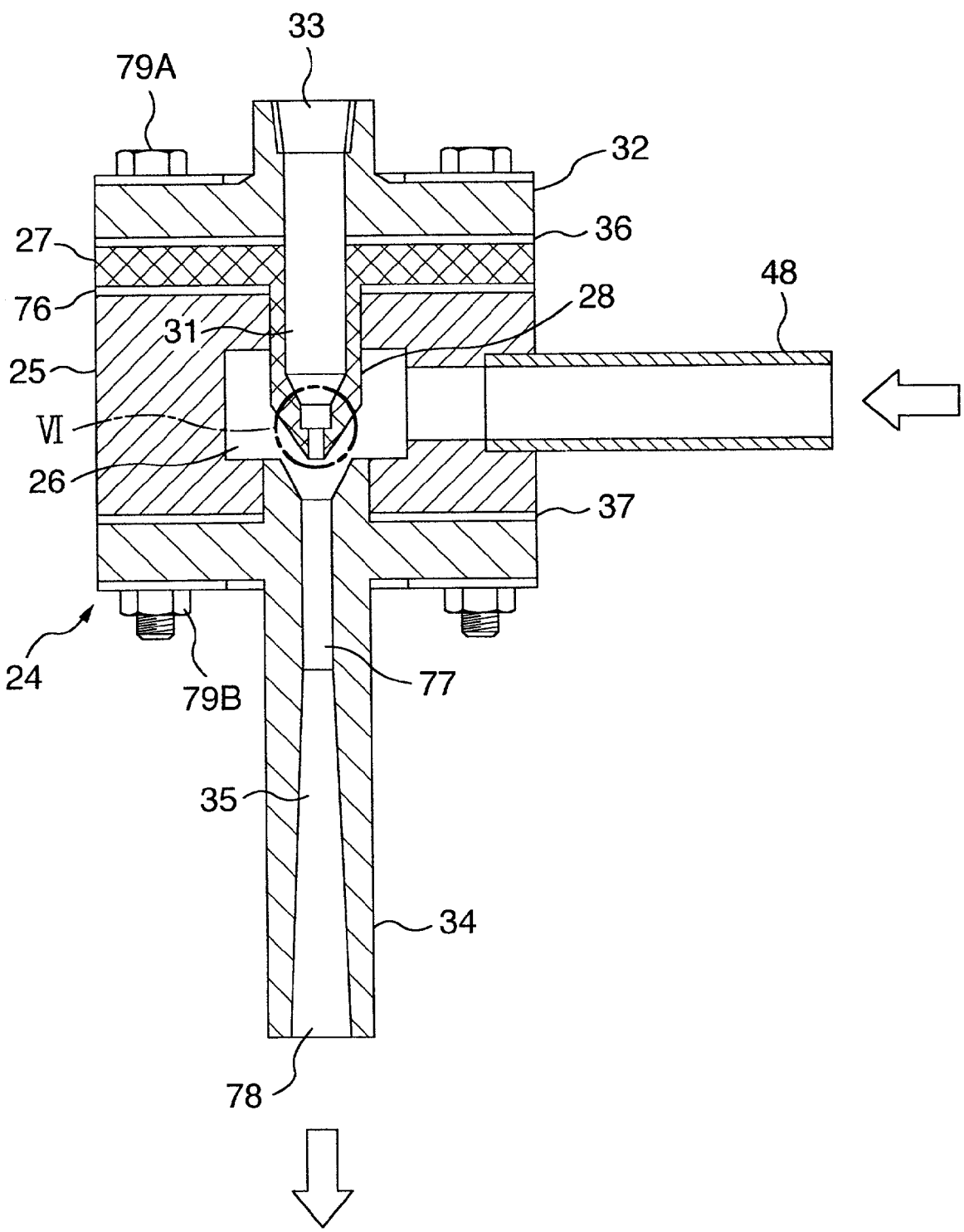
FIG. 5 is a vertical cross-sectional view of ejector shown in FIG. 1.
Figure 6:
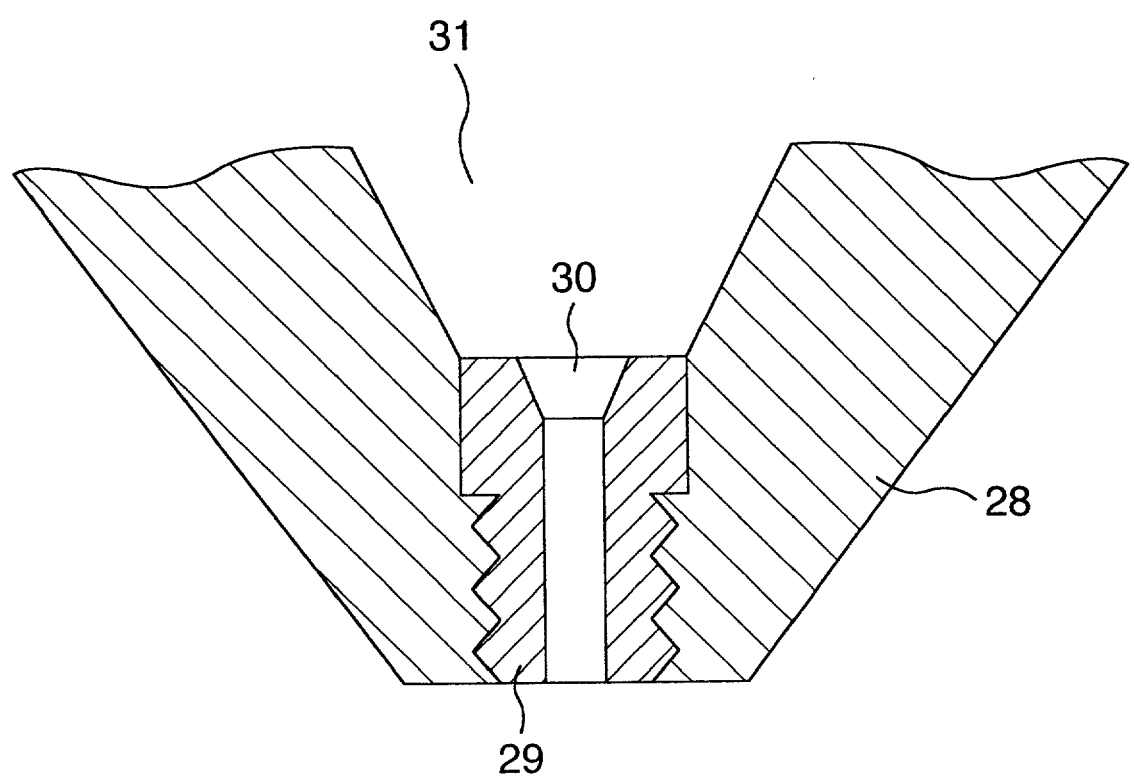
FIG. 6 is an enlarged cross-sectional view of zone VI of FIG. 5.

As shown in FIG. 5, ejector 24 comprises ejector body 25, injection nozzle 27 and ejection nozzle 34. Ejector body 25 has internal space 26 within it. Injection nozzle 27 has nozzle member 28. As shown in FIG. 6, injection member 29 is screwed into the tip end part of nozzle member 28. Injection orifice 30, about 2 mm in inner diameter, is formed in injection member 29. Injection member 29 is made of highly corrosion-resistant and highly durable metal or ceramic. Ejection nozzle 34 has ejection passage 35 within it. Injection nozzle 27 is provided against one end of ejector body 25 through packing 76. Tip end of nozzle member 28 of injection nozzle 27 is inserted into ejector body 25 and is positioned in internal spacing 26. Injection orifice 30 is connected to flow passage 31 formed in nozzle member 28 and to internal spacing 26. Ejection nozzle 34 is provided against another end of ejector body 25 through packing 37. Ejection passage 35 of ejection nozzle 34 is counter-posed to injection member 29 screwed in nozzle member 28. Inlet of ejection passage 35 is connected to internal space 26.

Ejection passage 35 has throat region 77 with a minimum passage cross-sectional area within it. Ejection passage 35 is increased in the passage cross-sectional area from throat region 77 toward the inlet and also from throat region 77 toward ejector outlet 78. Degree of the latter increase in the passage cross-sectional area is smaller than degree of the former increase. Pressing plate 32 with flow inlet 33 is counterposed to injection nozzle 27 through packing 36. Pressing plate 32, injection nozzle 27, ejector body 25 and ejection nozzle 34 are arranged in this order and secured by bolts 79A and nuts 79B. Other members than pressing plate 32 and injection member 29 of injection nozzle 27, e.g. ejector body 25 and ejection nozzle 34, are made of highly corrosion-resistant plastic, for example vinyl chloride resin (or fluororesin, etc.).

Piping 48 provided on ejector body 25 is connected to discharge outlet 21 formed at the top of upper compartment 20 of cyclone 16. Piping 48 is also connected to internal space in ejector body 25. Piping 49, connected to discharged gas duct 75 is connected to ejector outlet 78 of ejection nozzle 34. Condensate drain piping 55 connected to piping 49 is connected to discharged water tank 12. Water feed pipe 50 is connected to spray 15. Water feed pipe 51 is connected to spray 11. Water feed pipe 52 is connected to spray 7. Water feed pipes 51 and 52 are connected to water feed pipe 50.

Compressed air feeder 81 is fixed to pressing plate 32. As shown in FIG. 1, compressed air feeder 81 comprises air feed pipe 56, pressure central valve 63 and air feed valve 64. Air feed pipe 56 is connected to pressing plate 32 and communicated with flow inlet 33. Pressure control valve 63 is provided in air feed pipe 56, whereas air feed valve 64 is provided in air feed pipe 56 at a position upstream of pressure control valve 63. Air feed pipe 56 is connected to a compressor, though not shown in the drawings. Numeral 65 is a pressure switch for safety interlock.

PFC treatment in PFC treating apparatus 1 of this embodiment will be described below.

PFC contained in the discharged gas to be fed to PFC treating apparatus depends on kinds of semiconductors produced in semiconductor production apparatuses or semiconductor makers. Production of wafers as a based material for semiconductors involves cases of using a single PFC and a plurality of PFCs. In this embodiment, the case of using $SF_6$ and $C_2F_6$ as PFC in the semiconductor production is explained.

Discharged gas containing $SF_6$ and $C_2F_6$ as PFC, $SiF_4$ and HF from etching chambers 68, 69, 71 and 72 is fed to inlet packed column 8 of a silicon removing apparatus through piping 40 by driving vacuum pumps 73A, 73B, 73C and 73D. The discharged gas ascends through packed bed 9 and is led to spray column 10 of the silicon removing apparatus through piping 41. Fresh water fed through water feed pipe 51 is fed into spray column 10 through spray 11. The sprayed water is discharged into piping 41 and led to inlet packed column 8. Discharged water in discharged water tank 12 is fed to inlet packed column 8 through discharged water pipe 46 and piping 66 by driving discharged water pump 80. The discharged water and the sprayed water descend through packed bed 9.

$SiF_4$ contained in the discharged gas undergoes reaction of the following reaction equation (4) through contact with water (discharged water and water sprayed in spray column 10) in inlet packed column 8 and is decomposed to $SiO_2$ and HF:

$$SiF_4 + 2H_2O \rightarrow SiO_2 + 4HF \tag{4}$$

HF contained in the discharged gas fed to inlet packed column 8 and HF formed by reaction of the reaction equation (4) are absorbed into water in inlet packed column 8 and removed from the discharged gas. $SiO_2$ as a solid is also washed away by the washing water. Packed bed 9 acts to increase a contact efficiency between the ascending discharged gas and the descending washing water and increase a reaction efficiency of the reaction equation (4) and an absorption efficiency of HF into water. Water containing $SiO_2$ and absorbed HF is led to discharged water tank 12 below inlet packed column 8 through piping 57. Other impurities contained in the discharged gas are also removed by water in inlet packed column 8 and spray column 10.

HF not absorbed into water in inlet packed column 8 is led to spray column 10 together with the discharged gas and absorbed into sprayed water there. SiF4 remaining in the discharged gas led to spray column 10 from inlet packed column 8 undergoes reaction of the reaction equation (4) through contact with the sprayed water in spray column 10. HF generated from the reaction is absorbed into the sprayed water. Generated $SiO_2$ is also washed away by the sprayed water and discharged into inlet packed column 8 and piping 57.

The discharged gas containing $SF_6$ and $C_2F_6$ discharged into piping 42 from spray column 10 is fed to heated space 5 of reactor 2 at a flow rate of 60 l/min. The discharged gas contains neither HF nor $SiF_4$ nor $SiO_2$ formed by the reaction of the reaction equation (1). Water (or steam) is fed through piping 43 to heated space 5, and air is fed thereto through piping 44. Decomposition reaction of PFC by a catalytic action is hydrolysis, and thus the necessary water (or steam) for the reaction is fed thereto. The discharged gas is heated, together with the water and the air, to the temperature of 750° C., at which decomposition of $SF_6$ and $C_2F_6$ by the catalytic action starts, by heater 4. Depending on the kinds of PFC heating temperature is about 650° to about 750° C. Water turns to steam. The discharged gas containing steam, air, $SF_6$ and $C_2F_6$ heated to 750° C. is fed to catalyst cartridge 3.

Reaction of the above-mentioned reaction equation (2) and reaction of the following reaction equation (5) of $SF_6$ and $C_2F_6$ with $H_2O$ are promoted by the action of alumuna-based catalyst in catalyst cartridge 3 to decompose $SF_6$ to $SO_3$ and HF and $C_2F_6$ to $CO_2$ and HF.

$$SF_6 + 3H_2O \rightarrow SO_3 + 6HF \tag{2}$$

$$C_2F_6 + 3H_2O + air(O_2) \rightarrow 2CO_2 + 6HF \tag{5}$$

Reactions of the reaction equations (2) and (5) take place in the presence of steam. $SF_6$ and $C_2F_6$ are 100% decomposed. In the case that air, particularly oxygen, is not fed to catalyst cartridge 3, harmful CO is formed by reaction of $C_2F_6$ with $H_2O$. When air is fed thereto, the oxygen contained in the air converts CO to harmless $CO_2$, and thus no CO is generated as shown by the reaction equation 5. Oxygen may be fed thereto in place of air.

By use of a catalyst comprising 80% $Al_2O_3$ and 20% NiO, $SF_6$ and $C_2F_6$ are 100% decomposed in catalyst cartridge 3 at 750° C. Besides the catalyst comprising 80% $Al_2O_3$ and 20% NiO, such kinds of catalyst as disclosed in sections "Means for solving the Problem" and "Modes of Embodiments of the Invention" of JP-A-11-70322 (catalysts containing an Al oxide and at least one of oxides of metals selected from Zn, Ni, Ti, F, Sn, Co, Zr, Ce, Si and Pt) can decompose PFC.

In this embodiment, since silicon contained in the form of such compounds as $SiF_4$, etc. in the discharged gas can be removed by carrying out the reaction of the reaction equation (4) in the silicon removing apparatus, catalytic decomposition efficiency of PFC can be increased. When the discharged gas containing silicon is fed to reactor 2, the reaction of the reaction equation (4) takes place in heated space 5 by water (or steam) fed through piping 43, and the generated $SiO_2$ is led to catalyst cartridge 3. In that case, there are the following problems ① and ②. ① the resulting $SiO_2$ plugs pores formed in the catalyst. ② the resulting $SiO_2$ plugs clearances formed between catalysts. Catalyst surface area is reduced by ① and ②, lowering the PFC decomposition reaction rate. Discharged gas flow through clearances between the catalysts is deteriorated due to ②, inhibiting the catalyst and the discharged gas from their contact, resulting in lowering of PFC decomposition reaction rate. In this embodiment, $SiO_2$ is removed in advance in the silicon removing apparatus, and thus the PFC decomposition efficiency can be improved without said problems.

Discharged gas containing $SO_3$, $CO_2$ and HF as decomposition gases of $SF_6$ and $C_2F_6$ is fed to cooling chamber 6 from catalysts cartridge 3. Water fed through water feed pipe 52 is sprayed from spray 7 into cooling chamber 6. The discharged gas is cooled through contact with the sprayed water, so the discharge gas temperature is lowered to 100° C. or lower, whereby apparatuses at the positions downstream of reactor 2 (cooling chamber 6, discharged gas washing column 13, cyclone 16 and ejector 24) and pipings connecting one apparatus to another (pipings 45, 47, 48 and 49, discharged water pipe 46, drain pipes 53 and 54 and condensate drain piping 55) can be made of vinyl chloride resin (or fluoro-resin, etc.) as highly corrosion-resistant plastics. Pipings 57 and 66 can be also made of vinyl chloride resin.

A portion of HF contained in the discharged gas is absorbed into the sprayed water. The sprayed water and the discharged gas are led to the space above liquid level 61 in discharged water tank 12 from cooling chamber 6 through piping 45 (see FIG. 7). Discharged water is stored in discharged water tank 12 temporarily. By driving discharged water pump 80, the water in discharged water tank 12 is discharged into discharged water pipe 46 to a discharged water treatment plant (not shown in the drawing) near the PFC treating apparatus.

As shown in FIG. 7, when the water discharged from inlet packed column 8 passes through piping 57, float 59 is in a floating state above float seat 58 in piping 57 in discharged water tank 12, and thus the water passes through float stopper 60 and float seat 58, and further passes at the open end of piping 57 and is fed to discharged water tank 12. Float 59 is inhibited from further upward movement by float stopper 60. The discharged gas, when happens to flow into piping 57 at inlet packed column 8, passes through piping 57 to reach such part of piping 57, as is in discharged water tank 12. At the position near the open end of piping 57, the water is pushed out of piping 57 by the discharged gas to establish a discharged gas atmosphere. Float 59 fails to maintain floating in piping 57 in such a discharged gas atmosphere and falls onto float seat 58 to close the opening end. Thus, flow of the discharged gas from inlet packed column 8 into piping 57 is stopped.

Such a discharged gas containing decomposition gases is led to discharged gas washing column 13 from discharged water tank 12. Water fed through water feed pipe 50 is sprayed by spray 15. The sprayed water descends through packed bed 14 to fall into discharged water tank 12. The discharged gas ascends through packed bed 14. $SO_3$ and HF as acid gases contained in the discharged gas are absorbed into the sprayed water and separated from the discharged gas. However, a small amount of acid gases and acid gas mists ($SO_3$ mists) containing moisture are discharged into piping 47 from discharged gas washing column 13 and fed to flow passage 39 in discharged gas feed member 38 of cyclone 16. An aqueous alkaline solution (aqueous NaOH solution or aqueous KOH solution) may be sprayed by spray 15 in place of water.

The discharged gas is fed to lower compartment 19 of cyclone 16 through flow passage 39 and descends while whirling around passage 18. Acid gas mists contained in the discharged gas are separated from the discharged gas by whirling of the discharged gas and blown off outwardly to attach to the side walls of lower compartment 19. The attached mists flow down along the side walls toward the bottom of lower compartment 19. The separated acid gas mists are discharged into discharged water tank 12 from drain outlet 23 through drain piping 53. The whirling stream of the discharged gas in lower compartment 19 ascends through passage 18, while whirling, and reaches upper compartment 20. Since the discharged gas is still in a whirling state even in upper compartment 20, the acid gas mists entrained in the discharged gas are separated from the discharged gas and flow downward along the side walls of upper compartment 20. The separated acid mists are discharged into discharged water tank 12 through drain outlet 22 and drain piping 54.

The discharged gas with considerably reduced content of acid gas mists is discharged into piping 48 from discharge outlet 21 and then led to ejector 24.

Compressed air, which is compressed by a compressor (not shown in the drawings), is fed to ejector 24 through air feed pipe 56 by opening air feed valve 64. The compressed air is a driving gas for ejector 24. Pressure of compressed air is controlled to a set pressure by adjusting the opening degree of pressure control valve 63. Compressed air is fed to ejector 24 at substantially the same flow rate as that of the discharged gas to be fed to reactor 2, i.e. about 60–about 80 l/min and at a pressure of about 0.1 Mpa. N2 gas or He gas may be used as a driving gas in place of the compressed air.

In FIGS. 5 and 6, the compressed air is fed to flow passage 31 of nozzle member 28 from flow inlet 33 and injected from injection orifice 30 toward ejection passage 35 of ejection nozzle 34 at a sonic or supersonic speed. The injection stream of compressed air from injection orifice 30 generates a negative pressure in throat region 77 or its neighborhood of ejection passage 35. By the action of the negative pressure, the discharged gas in piping 48 is sucked into ejection passage 35 through internal space 26 and discharged into piping 49. The discharged gas is led to discharged gas duct 75 through piping 49 (FIG. 2). Condensate contained in the discharged gas from ejector 24 is led to discharged water tank 12 through condenate drain piping 55. By the sucking action of ejector 24 to such the discharged gas, cooling chamber 6, discharged water tank 12 and discharged gas washing column 13 are kept in a negative pressure state to prevent $SO_3$, HF, etc. contained in the discharged gas from leakage to the outside.

Figure 8:
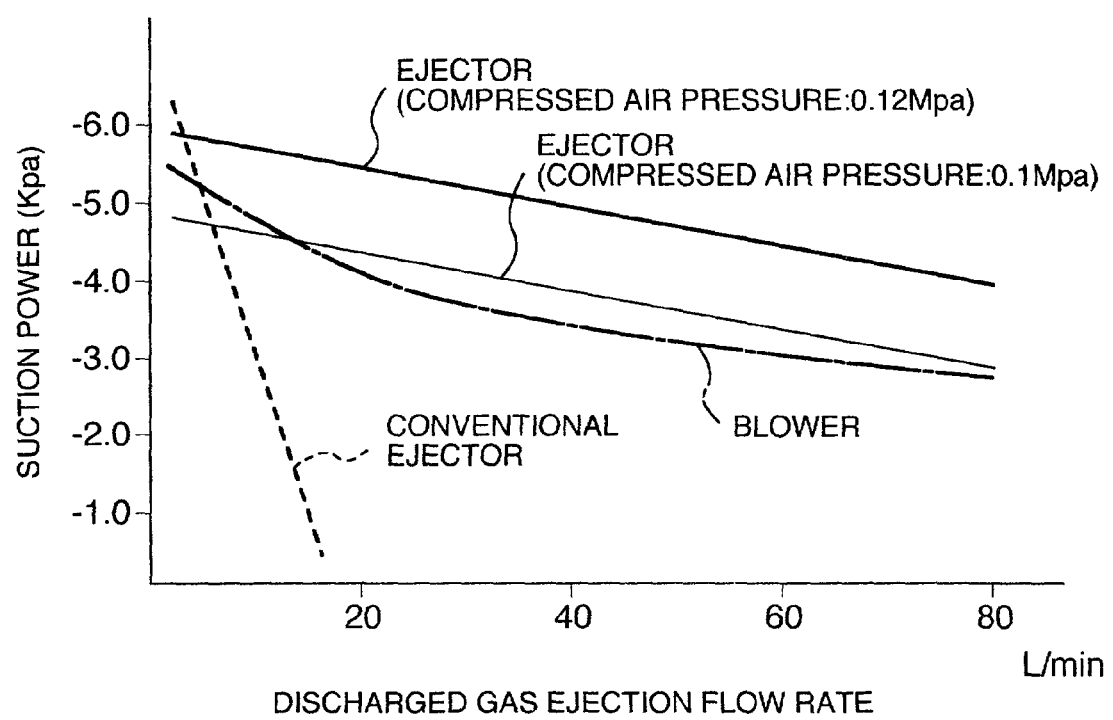
FIG. 8 is a diagram showing evacuating characteristics of ejector of FIG. 5.

Generally, the conventional ejector has been used to generate a high vacuum state. Thus, the conventional ejector cannot have no such higher suction gas rate than that of blowers and thus fails to serve as a substitute for blowers. In the conventional ejector, ejector suction power largely depends on pressure of driving compressed air and is abruptly lowered with increasing ejection flow rate of the gas to be sucked, as shown in FIG. 8 by the dotted line. It is impossible to use an ejector generally used for generating a vacuum state (generation of suction power) as a substitute for a blower because of too large differences in the characteristics therebetween.

On the other hand, ejector 24 used in this embodiment has such ejection characteristics as shown in FIG. 8 by the full line. Even if the ejection flow rate of the discharged gas from ejector 24 is increased, degree of lowering of the suction power of ejector 24 can be kept small. Ejector 24 has been developed by the present inventors. Ejector 24 has substantially equivalent ejection characteristics to those of the blower (as shown in FIG. 8 by the dash-and-dot line). Even if the pressure of driving compressed air to be fed to ejector 24 is changed to e.g. 0.1 Mpa and 0.12 Mpa, respectively, the degree of lowering of the suction power is substantially not changed against the increasing ejection flow rate of discharged gas. Thus, ejector 24 can have a large ejection flow rate of discharged gas.

Furthermore, as characteristics of ejector 24, discharged gas suction power increases proportionally to increasing pressure of driving compressed air. There would be a risk of damaging ejector 24 due to higher vacuum established when the pressure of compressed air to ejector 24 exceeds the set pressure as a result of disorder in pressure control valve 63. Pressure switch 65 detects pressure in air feed pipe 56 at the position downstream of pressure control valve 63 to close air feed valve 64 when the pressure exceeds the set pressure and stops the compresser (not shown in the drawings).

Discharged gas led to ejector 24 contains a small amount of acid gas mists, but ejector 24 made of a highly corrosion-resistant plastic has no fear of corrosion, even if it is brought into contact with the acid gas mists. In this embodiment any corrosion due to decomposition gas does not take place in ejector 24 as a decomposition gas-containing discharged gas ejecting apparatus, and thus maintenance working such as inspection, part replacement, etc. of the discharged gas ejecting apparatus (apparatus for injecting a gas to such another gas) is substantially not required. That is, a frequency of maintenance inspection is considerably lower than in the case of using a blower, and continuous operation rate of PFC treating apparatus 1 is considerably improved. Since injection member 29 with injection orifice 30 for ejecting the discharged gas at a sonic or supersonic speed is made of a highly corrosion-resistant, highly durable ceramic, wearing due to sonic speed-discharged gas is considerably less, contributing to lowering of a frequency of maintenance inspection of ejector 24. Thus, ejector 24 can perform continuous long-term operation fully.

Use of cyclone 16 as a mist separating apparatus can reduce the amount of acid gas mists to discharged gas duct 75 through ejector 24. Thus, the amount of mists condensed in discharged gas duct 75 can be reduced, considerably reducing corrosion of discharged gas duct 75. Reduction in the amount of mists results in further prolongation of the life of ejector 24.

Discharged water tank 12 is at the lowest position and thus the water discharged from inlet packed column 8 and spray column 10, sprayed water from cooling chamber 6 and discharged gas washing column 13 and drain water separated in cyclone 16 flow into discharged water tank 12 by gravity. Thus, pumps for transferring these kinds of water to discharged water tank 12 are not required, thereby making the structure of PFC treating apparatus 1 more compact.

PFC treating apparatus 1 of this embodiment can decompose any other PFC than $SF_6$ and $C_2F_6$.

$SF_6$ decomposition treatment test was carried out in PFC treating apparatus 1 shown in FIG. 1, using a simulation gas containing $SF_6$. Simulation gas was prepared by diluting $SF_6$ with a nitrogen gas to contain 0.5% $SF_6$. The simulation gas was fed to reactor 2 of PFC treating apparatus 1 at a flow rate of 60 l/min. Air and water were also fed to reactor 2 at 15 l/min. and 20 ml/min, respectively. The simulation gas containing water and air was heated to 750° C. by an electric heater in heating space 5. Then, the simulation gas was fed to catalyst cartridge 3 and decomposed. Catalyst packed in catalyst cartridge 3 was a NiO and $Al_2O_3$-containing catalyst.

$SF_6$ was treated at a space velocity of simulation gas to catalyst of 1,000/h. Gas containing $SF_6$ decomposition gas, discharged from reactor 2 was cooled in cooling chamber 6 and then led to cyclone 16 at a flow velocity of about 20 m/s through discharged gas washing column 14. Acid gas mists separated and removed by cyclone 16 was discharged into discharged water tank 12 from the bottom of cyclone 16 through drain piping 53. Gas discharged from cyclone 16 was sucked by ejector 24 driven by compressed air at 0.1 Mpa. Flow rate of compressed air to ejector 24 was about 70 l/min. $SO_3$ concentration of the gas at a position upstream of cyclone 16 (in piping 47) and at a position downstream thereof (in piping 48) was measured to determine a mist removal efficiency of cyclone 16. Since $SO_3$ mists are formed by absorption of water molecules around $SO_3$ as nuclei, a mist removal efficiency of cyclone 16 can be calculated by a ratio of $SO_3$ concentration in piping 48 to that in piping 47. $SO_3$ concentration was calculated by subtracting a gas chromatographically measured $SO_2$ concentration from a SOx concentration measured by a liquid trapping method. As a result, $SO_3$ concentration was 1,400 ppm at the position upstream of cyclone 16, whereas it was 280 ppm after cyclone 16. That is, 80% of the mists was removed by cyclone 16.

Mist particle size distribution was measured at the outlet of cyclone 16. Mists contained in the gas discharged from cyclone 16 had particle sizes substantially smaller than 1 μm. Mists having particle sizes of 1 μm or more were removed by cyclone 16. After the treating operation for a predetermined time, ejector 24 was dismantled and it was found by inspection that no corrosion took place at the interior of ejector 24 and no condensate was observed in piping 49 at the outlet side of ejector 24.

In place of the aforementioned $SF_6$-containing simulation gas, a $NF_3$-containing simulation gas was used to conduct the same test as in the case of using the $SF_6$-containing simulation gas. Nitric acid mists were smaller in particle sizes than sulfuric acid mists, and accordingly the removal efficiency of the mist removing apparatus was as low as 20–30%, but no corrosion, etc. were found to take place in the ejector as in the test with the $SF_6$-containing simulation gas.

Figure 9:
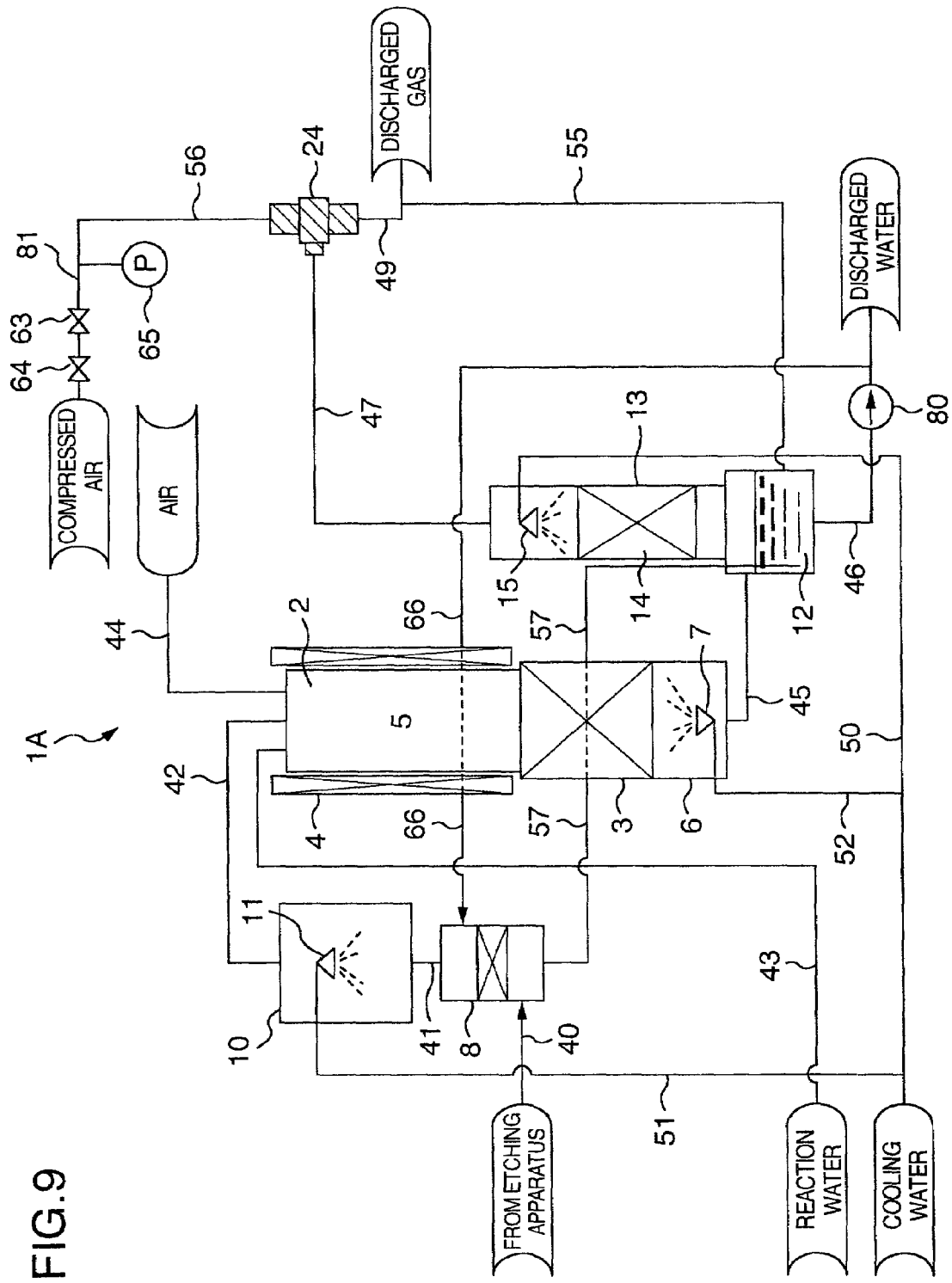
FIG. 9 is a structural diagram of an apparatus for treating perfluorocompounds according to another preferable embodiment of the present invention.

PFC treating apparatus 1A as another embodiment of the present invention will be described below, referring to FIG. 9, where the same members as in embodiment of FIG. 1 are identified by the same reference numerals. PFC treating apparatus 1A is different from PFC treating apparatus 1 only in omission of cyclone 16 of FIG. 1. Accordingly, piping 47 connects the top of discharged gas washing column 13 directly to internal space 26 of ejector 24. In this embodiment, the discharged gas in discharged gas washing column 13 is sucked into piping 47 by the suction by ejector 24 and discharged into piping 49.

In this embodiment, the structure is more simplified than PFC treating apparatus 1 due to the omission of cyclone 16. This embodiment is preferably applied to the case that the concentration of PFC to PFC treating apparatus 1A is low and the amount of acid gas mists entrained in the discharged gas from discharged gas washing column 13 is small.

When the concentration of PFC to the PFC treating apparatus is low, discharged gas washing column 13 may be omitted in the embodiment of FIG. 1, where piping 47 connected to cyclone 16 is connected directly to the space above liquid level 61 in discharged water tank 12.

Figure 10:
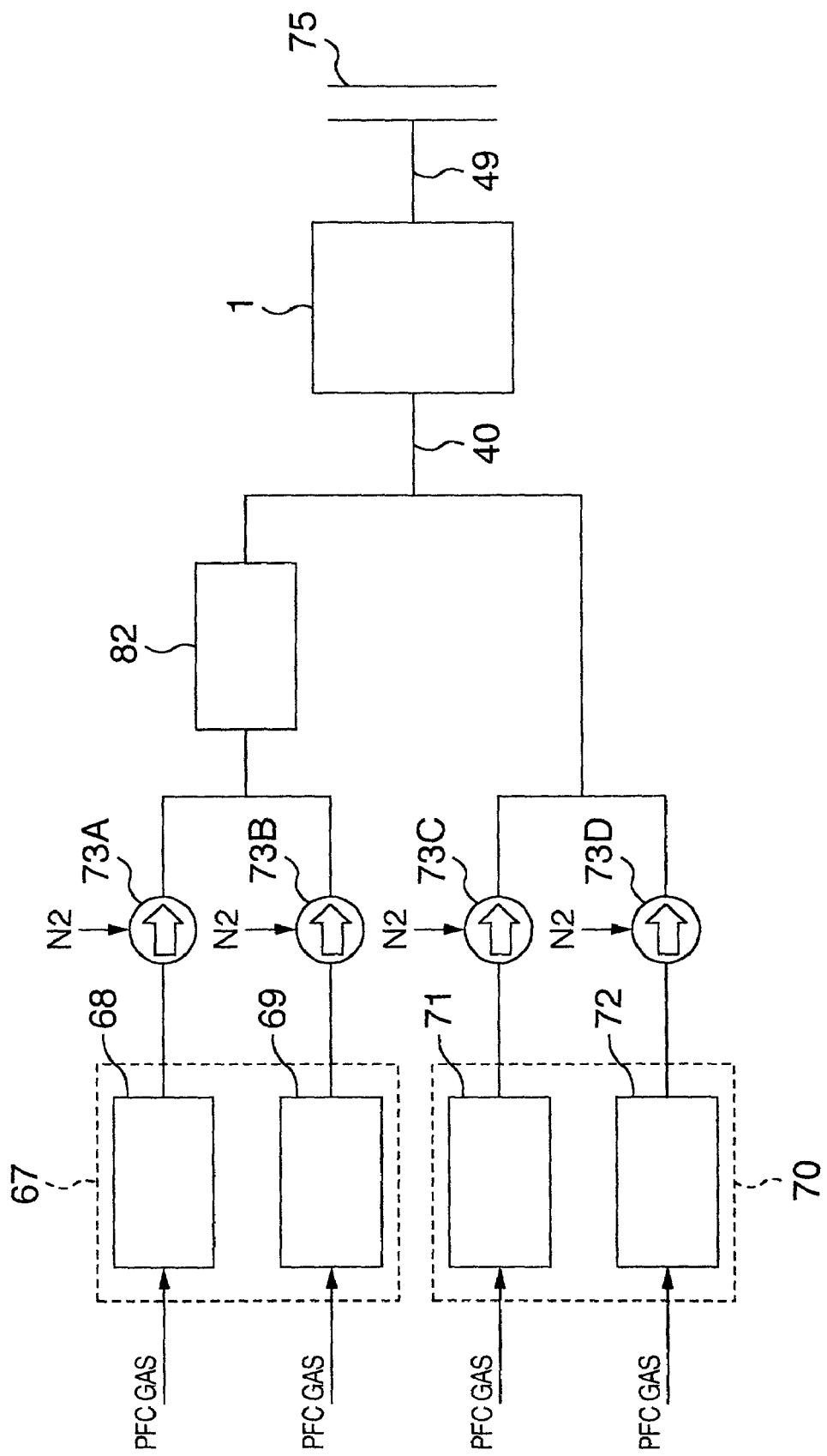
FIG. 10 is a structural diagram of another example of a semiconductor production plant in which the present apparatus for treating perfluorocompounds is incorporated.

In the semiconductor production plant, wafers with metallic wirings are etched in some case. For example, in the semiconductor production plant shown in FIG. 10, wafers with metallic wirings are etched in etching chambers 68 and 69 of etching apparatus 67. A large amount of attachable by-products originating from the metallic wirings are generated by the etching. Residual PFC containing the by-products, HF and $SiF_6$ are discharged from etching chambers 68 and 69 and fed, together with $N_2$ gas fed to vacuum pumps 73A and 73B, to pretreating apparatus 82 packed with activated carbon. The attachable by-products are removed by pretreating apparatus 82. The discharged gas from pretreating apparatus 82 is led to PFC treating apparatus 1 through piping 40. By removing the attachable by-products by pretreating apparatus in this manner, PFC can be efficiently decomposed by catalyst cartridge 3.

In some case, a chlorine gas, a hydrogen chloride gas or a hydrogen bromide (HBr) gas is used as etching gas besides the PFC gas, where the chlorine gas, the hydrogen chloride gas or the hydrogen bromide gas is mixed with the PFC gas and fed to the etching chambers. Depending on the etching treatment, the chlorine gas, the hydrogen chloride gas or the hydrogen bromide gas is fed to the etching chambers after the etching by the PFC gas has been finished. Depending on the case, etching treatment by the chlorine gas, the hydrogen chloride gas or the hydrogen bromide gas is carried out before the etching treatment by the PFC gas, where feeding of the chlorine gas, the hydrogen chloride gas or the hydrogen bromide gas to the etching chambers is carried out before the feeding of the PFC gas. The chlorine gas, the hydrogen chloride gas and the hydrogen bromide gas are the same acid gases as HF.

The case of feeding a chlorine gas and a PFC gas to etching chambers will be described below. Discharged gas containing chlorine gas and PFC gas discharged from the etching chambers and the $N_2$ gas from vacuum pumps is fed to PFC treating apparatus 1 as shown in FIG. 1 through piping 40. Decomposition treatment of PFC in PFC treating apparatus 1 is carried out in the same manner as described in the embodiment of FIG. 1. Behavior of the chlorine gas in PFC treating apparatus 1 will be described below.

Simulation gas containing $N_2$ and 1% $Cl_2$ was fed to PFC treating apparatus 1. The $Cl_2$ gas was passed through inlet packed column 8 and spray column 10 to reach reactor 2 through piping 42. The catalyst temperature was 750° C. (simulation gas flow rate: 60 l/min.). The $Cl_2$ gas was substantially not removed in inlet packed column 8 and spray column 10. Air and reaction water were fed to reactor 2 at 10 l/min. and 15 ml/min., respectively. The $Cl_2$ gas is oxidized by the catalyst in catalyst cartridge 3 to turn to a HCl gas by reaction shown by the following reaction equation (6).

$$2Cl_2 + 2H_2O \rightarrow 2HCl + O_2 \qquad (6)$$

The HCl gas is easily soluble in water and thus was absorbed into sprayed water in discharged gas washing column 13 and removed from the simulation gas. The simulation gas was discharged from discharged gas washing column 13 at a $Cl_2$ concentration of 100 ppm. That is, 99% of $Cl_2$ was removed thereby. No HCl was detected in the discharged simulation gas. No corrosion by the $Cl_2$ gas was found on ejector 24.

What is claimed is:

1. An apparatus for treating perfluorocompounds, which comprises:

a perfluorocompound decomposing apparatus for decomposing perfluorocompounds contained in a gas fed thereto, an acid gas removing apparatus for removing acid gases resulting from the decomposition of the perfluorocompounds from the discharged gas, a gas suction apparatus for sucking the discharged gas in the acid gas removing apparatus by a jet stream of an injecting gas, thereby ejecting the gas, a mist separation apparatus for separating mists from the gas discharged from the acid gas removing apparatus by suction by the gas suction apparatus, and a tank for receiving one of the water and the aqueous alkaline solution from the acid gas removing apparatus and a discharging piping leading the mists separated in the mist separating apparatus to the tank are provided below the acid gas removing apparatus and the mist separating apparatus.

2. An apparatus according to claim 1, wherein the perfluorocompound decomposing apparatus is packed with a catalyst acting to decompose the perfluorocompounds.

3. An apparatus according to claim 2, wherein the catalyst contains an Al oxide and further one oxides of metals selected from Zn, Ni, Ti, F, Sn, Co, Zr Ce, Si and Pt.

4. An apparatus according to claim 1, wherein the gas suction apparatus is an ejector.

5. An apparatus according to claim 4, wherein a means of stopping feeding of driving gas to the ejector, when the pressure of the driving gas to the ejector exceeds a set pressure is further provided.

6. An apparatus according to claim 1, wherein the mist separation apparatus is a cyclone that separates mists contained in the discharged gas from the discharged gas by whirling of the discharged gas.

* * * * *